UNITED STATES PATENT OFFICE.

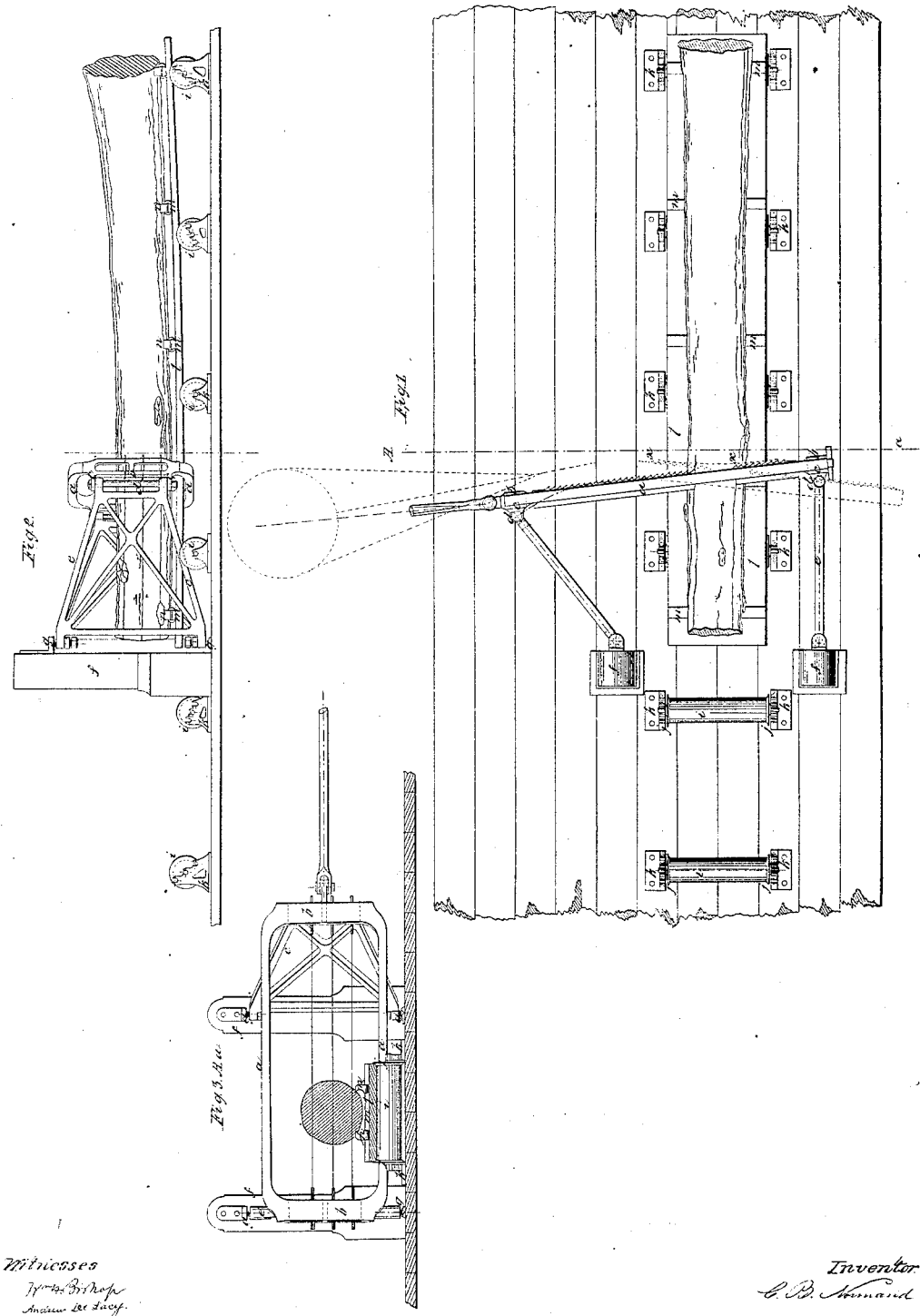

C. B. NORMAND, OF HAVRE, FRANCE.

METHOD OF HANGING SAWS FOR MILLS.

Specification of Letters Patent No. 11,945, dated November 14, 1854.

*To all whom it may concern:*

Be it known that I, C. B. NORMAND, of Havre, France, have invented certain new and useful Improvements in Saw-Mills, of which the following is a full, clear, and exact description, reference being had to the accompanying drawings, making part of this specification, in which—

Figure 1, is a plan; Fig. 2, a side, and Fig. 3, a vertical cross section taken at the line $a, a$, of Fig. 1.

The same letters indicate like parts in all the figures.

My said invention relates to a method of guiding and moving saw blades, strained in a saw gate, in order to reduce the amount of power required to perform mechanical sawing, and also the wear and tear of the saw blades, and the mechanism by which the same are operated.

It is a well known fact established by well conducted experiments, that a given amount of sawing performed by machinery requires the expenditure of a far greater amount of power, than when done by hand sawing. This is believed to be due to the peculiar motion given to the saw when operated by hand. In hand sawing a certain curvilinear motion (in the plane of the cut) is imparted to the sawe blade, the under part gradually receding as it descends, while the upper part advances in a corresponding quantity so as to keep the toothed edge in contact with the wood which is thus made to assume a curved line upon which the sawing operation is carried on at each stroke from the under to the upper part of the cut. A few teeth only are thus in action at a time, but these readily remove the required quantity of material, cutting it in few fragments and then receding which affords ample clearance to the sawdust. In the actual mode of mechanical sawing the front of the saw is set at such an inclination with its straight line of motion, that in a length equal to the stroke the upper part projects a quantity equal to the advance of the wood, or thereabouts. As the saw blade descends each tooth in succession cuts through the entire thickness of the material, all the teeth comprised in the thickness of the log being simultaneously in contact with the wood, leaving but the spaces between them for the clearance of the saw dust.

The object of the first part of my invention is to give to the cutting edge of the saw, a motion resembling that given by the sawyers in hand sawing, and to this end my invention consists in hanging the saw gate, in which the saws are strained, to the outer ends of two vibrating arms or beams, having their points of attachment at the saw gate further apart than the distance between the fixed axes of vibration, so that the saw gate in moving to give the cut shall have the end beyond the log receding from the part of the log that is being cut, while the other or approaching end is advancing or moving toward the part being cut. And the second part of my invention consists in placing and running the saw gate horizontally and with the plane of the saw or saws horizontal, or nearly so, in combination with the placing of the carriage, which passes through the saw gate, with its transverse plane parallel with and below the plane of the saw, or saws. By means of this arrangement and combination the log or timber can be supported on and secured to the carriage from end to end without impediment to the saw, which cannot be the case when the plane of the carriage is at right angles to the plane of the saw as heretofore practiced, for in that case the saw must pass through the carriage, or the log must project beyond the edge of the carriage which is not practical for sawing logs, particularly into planks with or without a gang of saws. And another material advantage of my said invention is, that the line of motion of the saw gate being parallel with the floor of the mill, I effectually, and at very little cost, avoid that tremulous motion heretofore experienced in saw mills however firmly constructed and braced, and I also avoid much of the expense of construction and repairs by having the whole mechanism and its connections on one and the same floor. And my said invention also consists in composing the ways which support and on which the carriage runs in moving the logs to the saws, of a series of cylindrical rollers with end flanches, or the equivalents thereof, for guiding the carriage laterally, and having their journals adapted to a series of boxes on standards, or to shifting and adjustable boxes, in such relation to each other, that by shifting the rollers in the boxes, or adjusting the boxes, the upper part of the periphery of the rollers can be made to coincide with a flat plane or with a cylindrical surface of considerable radius, the horizontal axis of which should be in a vertical plane passing through the saws.

For this purpose the carriage should be made of a flexible plate, which, by bending, can be adapted to the bed of rollers, and its upper surface should be provided with suitable clamps or dogs for securing the log to the upper surface from end to end. In this way I am enabled to saw logs in straight or curved lines provided the curved lines be segments of circles of large radius.

In the accompanying drawings a, represents a saw gate with the saw or saws strained therein in the usual or any suitable manner. The cross heads b, b, at each end of this gate are provided with projecting ears c, c, two for each cross head, and through each pair a fulcrum bolt d, passes, and these bolts also pass through the ends of, and from the connections between, the saw gate and the two beams or vibrating arms e, e, which at their other end are connected with two standards f, f, by means of fulcrum bolts or pivots g, g, on which they vibrate. These two arms or beams are, or should be made of open work, as represented, and nearly the width of the saw gate at one end, and gradually spreading out toward their rear end. This form is deemed preferable to insure steadiness to the saw gate and prevent play, but may be deviated from at pleasure. The distance between the two arms or beams, at their junction with the saw gate, should be about as much greater than their distance apart at the fender posts, as the range of motion of the saw gate; and the gate should be so connected with the motor that the beam beyond the cutting edge of the teeth will be parallel with the log or nearly so when the saw gate is beginning the cutting motion, and the other in a corresponding position at the end of the cut. The connections of the beams with the saw gate and with the fender posts should be accurately made so as not to bind and at the same time avoid play.

From this arrangement of the two beams and their relations to each other and to the saw gate, it will be seen that in making the cut the farthest end of the saw gate will gradually recede, while the other end will gradually advance, and vice-versa, from which it will follow that the surface left by the cut of the front edge of the teeth will present a convexity, the saw gradually cutting from one to the other side of the log, and hence at any one time cutting only a part of the thickness of the log. The line of motion of the teeth is represented by the dotted red lines x, x, in Fig. 1.

I am aware that saw gates have been hung on the ends of two vibrating beams, but in such case the beams were parallel and the cutting edge did not, and could not have, the motion or cutting action which I am enabled to impart to it by the divergence of the two beams. And I am also aware that one end of the saw gate has been connected with one vibrating beam, and the other working in a slide, but this also fails to give the required motion and is objectionable on account of the slide.

I do not wish to be understood as limiting myself to any degree of divergency between the two vibrating beams, nor to the mode of constructing and connecting the beams and saw gate, as these may be greatly varied without changing the mode of operation which constitutes my invention.

The bed or way for the carriage consists of a series of cylindrical rollers i, with end flanches j, j, to guide the edges of the carriage. These rollers have their journals fitted to boxes in two ranges of standards k, k, secured to the floor of the mill. The standards for the two rollers next to the saw gate have but one box each, for these two rollers are not required to be shifted. But the other standards have each three boxes (more or less) arranged on an inclined line, and as they recede from the saw gate this inclination increases, so that by shifting the journals of the rollers in these boxes, the series of rollers can be adapted to the plane of the cut intended to be made.

Instead of the series of boxes in each standard, the standards themselves can be made adjustable so as to admit of shifting the rollers; or, in short, any other suitable mode of shifting the rollers may be employed.

The carriage l, of the required width and length, is a board having sufficient flexibility, in the direction of its length, to admit of being bent in a circle of large radius, if required. To the upper surface of this carriage are secured transverse metallic ways m, to which are fitted sliding dogs or clamps n, n. The bed rollers are arranged in their supporting boxes so that the upper part of their peripheries will coincide with the surface intended to be sawed, whether straight or curved, and the carriage placed upon the said rollers. The log o, to be sawed is then placed on the carriage, and wedges driven in between the top of the carriage and the under side of the log until the under side of the carriage is made to bear on all the rollers, and then the log is secured by driving in the dogs or clamps as represented in the drawings.

The log being secured to the top of the carriage which should be of ample width, and the carriage resting on the series of rollers, so located relatively to the saw gate that the carriage with its dogs or securing clamps will pass its whole length between the frame and the lowest of the gang of saws, it follows that the log can be cut from end to end without meeting any impediment. The weight of the log, the width of the carriage, and the flanches on the rollers will be found sufficient to prevent lateral play. In this way I am enabled to give ample support to the log along its whole length, without impediment either to the motion of the saws or the carriage.

The feed motion I do not deem necessary to describe or represent, as any of the known modes of giving the feed motion can be employed.

Having thus pointed out the principle or character of this part of my invention, and the mode of construction which I have adopted, I wish it to be distinctly understood that I do not limit myself to the special mode of construction specified, so long as the same ends are attained by the mere substitution of equivalent means.

What I claim as my invention and desire to secure by Letters Patent is—

1. Connecting the saw gate, in which the saws are strained, with the outer ends of two vibrating beams, one at each end, substantially as described, but this I claim only when the two beams diverge from each other from their axes of vibration to their connection with the saw gate, substantially as described, and giving a motion to the saw or saws, substantially on the principle herein specified.

2. And I also claim placing and running the saw gate horizontally, with the plane of the gate vertical or nearly so, substantially as specified, in combination with the placing of the carriage with its transverse plane parallel with, and below the saw or saws, and passing through the saw gate, substantially as and for the purpose specified.

3. And I also claim composing the ways for the carriage of a series of cylindrical rollers which can be shifted to variable heights, so that the upper part of their peripheries can be set to coincide with a flat plane, or arcs of circles of large radius, substantially as described, in combination with the flexible carriage which can be bent to the shape of the intended cut, as determined by the set of the rollers composing the ways, substantially as described.

C. B. NORMAND.

Witnesses:
WM. H. BISHOP,
ANDREW DE LACY.